United States Patent

Fujiwara et al.

[11] Patent Number: 5,835,170
[45] Date of Patent: Nov. 10, 1998

[54] ACTIVE MATRIX LCD WITH STORAGE CAPACITORS CONNECTED BETWEEN THE PIXEL ELECTRODE AND GATE LINES, NONE OF WHICH IS A GATE LINE FOR DRIVING THE PIXEL

[75] Inventors: Masahiro Fujiwara, Nara; Hiroshi Yoneda, Ikoma, both of Japan

[73] Assignee: Sharp Kabushiki Kaisha, Osaka, Japan

[21] Appl. No.: 961,137

[22] Filed: Oct. 30, 1997

[30] Foreign Application Priority Data

Nov. 7, 1996 [JP] Japan ................................ 8-294272

[51] Int. Cl.$^6$ ................................ G02F 1/1343
[52] U.S. Cl. ................................ 349/38; 349/39
[58] Field of Search ........................ 349/38, 39

[56] References Cited

U.S. PATENT DOCUMENTS 5,042,916  8/1991  Ukai et al. ............................ 359/59
5,159,477  10/1992  Shimada et al. ...................... 359/59
5,745,090  4/1998  Kim et al. ............................ 345/90

FOREIGN PATENT DOCUMENTS 62-223727  10/1987  Japan .
4-74714  11/1992  Japan .

Primary Examiner—William L. Sikes
Assistant Examiner—Robert J. Hollingshead
Attorney, Agent, or Firm—Nixon & Vanderhye, P.C.

[57] ABSTRACT

An active matrix type liquid crystal display device includes: a plurality of data lines and a plurality of gate lines disposed in a lattice manner; and a pixel having a pixel transistor, a pixel electrode, and a storage capacitor, the pixel being disposed at a intersection between the data line and the gate line. The storage capacitor includes electrodes connected to the pixel electrode and electrodes connected to a plurality of gate lines, none of which is a gate line for driving the pixel.

6 Claims, 12 Drawing Sheets

ACTIVE MATRIX LCD WITH STORAGE CAPACITORS CONNECTED BETWEEN THE PIXEL ELECTRODE AND GATE LINES, NONE OF WHICH IS A GATE LINE FOR DRIVING THE PIXEL

BACKGROUND OF THE INVENTION

1. FIELD OF THE INVENTION

The present invention relates to a structure of a storage capacitor which is suitable for an active matrix type liquid crystal display device.

2. DESCRIPTION OF THE RELATED ART

A conventional active matrix type liquid crystal display device will be described with reference to FIG. 8. As shown in an equivalent circuit of FIG. 8, a thin film transistor 806 (hereinafter, referred to as a "TFT") provided for each pixel controls a writing and holding of a signal in the active matrix type liquid crystal display device (hereinafter, referred to as an "AMLCD"). However, since the capability for holding a signal depends on the OFF resistance and the pixel capacitance of the TFT 806, the capacitance level of a liquid crystal capacitor $C_{LC}$ 808 alone is insufficient in the case where the OFF-state current of the TFT 806 is high. Therefore, it is necessary to provide a storage capacitor $C_S$ 809. Moreover, when a potential applied to gate lines 803 to 805 is converted from a high level to a low level, a change in a pixel voltage occurs due to a parasitic capacitor $C_{GD}$ 807 formed between a gate electrode 806c and a drain electrode 806b. Furthermore, the dielectric constant of the liquid crystal material in the ON state significantly differs from that in the OFF state. As a result, a difference is generated between a written signal voltage and an actual pixel voltage. As a method to reduce the amount of such differences, the storage capacitor $C_S$ 809 is commonly provided so as to be juxtaposed to the liquid crystal capacitor $C_{LC}$ 808.

Conventionally, as a method for structuring a storage capacitor, the following methods have been employed: that is, a method for structuring the storage capacitor between a common line for $C_S$ only and a pixel electrode (hereinafter, referred to as a "$C_S$ common structure" (see FIG. 9)); and a method for structuring the storage capacitor between a gate line which is not the one for driving the pixel and a pixel electrode (hereinafter, referred to as a "$C_S$-on-gate structure" (see FIG. 8)).

First, the $C_S$ common structure will be described. As shown in FIG. 9, each pixel includes a TFT 906, a liquid crystal capacitor 908, and a storage capacitor ($C_S$) 909. Herein, each of data lines 901 and 902 is connected to one electrode of the liquid crystal capacitor 908 and one electrode of the storage capacitor 909 via a source electrode 906a and a drain electrode 906b of the TFT 906. Gate lines 903 to 905 are connected to gate electrodes 906c of the TFTs 906, respectively. The other electrode of the liquid crystal capacitor 908 is connected to a counter electrode (not shown) with a liquid crystal layer interposed therebetween, and the other electrode of the storage capacitor ($C_S$) 909 is connected to a common electrode line 910 which is provided to be shared by all pixels in one row. The storage capacitor ($C_S$) 909 serves to minimize leakage currents of the liquid crystal capacitor 908 and the TFT 906, to minimize the change in a pixel voltage caused by a parasitic capacitor ($C_{GD}$) 907 formed between the gate electrode 906c and the drain electrode 906b of the TFT 906, and minimize the effects of display data dependency in the liquid crystal capacitor 908 and the like. According to the $C_S$ common structure, however, a newly provided signal line (in this case, the common electrode line 910) is required in order to structure the storage capacitor. As a result, a reduction in the aperture ratio of the pixel disadvantageously occurs.

In order to overcome this problem, the $C_S$-on-gate structure has been suggested.

Next, the $C_S$-on-gate structure will be described. As shown in FIG. 8, each pixel includes the TFT 806, the liquid crystal capacitor 808, and the storage capacitor ($C_S$) 809. Herein, each of data lines 801 and 802 is connected to one electrode of the liquid crystal capacitor 808 and one electrode of the storage capacitor ($C_S$) 809 via a source electrode 806a and the drain electrode 806b of the TFT 806. Gate lines 803 to 805 are connected to the gate electrodes 806c of the TFT 806, respectively. The other electrode of the liquid crystal capacitor 808 is connected to a counter electrode (not shown) with a liquid crystal layer interposed therebetween. The other electrode of the storage capacitor ($C_S$) 809 is connected to an adjacent gate line which is not the one for driving the pixel (for example, in the case where the gate line 803 is driven, the other electrode of the storage capacitor ($C_S$) 809 is connected to the gate line 804). The storage capacitor ($C_S$) 809 serves to minimize leakages currents of the liquid crystal capacitor 808 and the TFT 806, to minimize the change in a pixel voltage due to the parasitic capacitor $C_{GD}$ 807 formed between the gate electrode 806c and the drain electrode 806b of the TFT 806, and to minimize the effects of display data dependency in the liquid crystal capacitor 808 and the like. Since the $C_S$-on-gate structure does not require an additional signal line for a storage capacitor, an aperture ratio of the pixel can be advantageously improved.

According to the $C_S$-on-gate structure, as shown in FIGS. 10A and 10B, during an OFF period of the TFT in an nth gate line G(n), a gate line G(n-1) constituting the other electrode of the storage capacitor $C_S$ provided in a pixel driven by the nth gate line G(n) becomes high and remains at a high level over one horizontal period. At this time, a change in a voltage of the gate line G(n-1) is transmitted to a pixel electrode driven by the nth gate line G(n) via the storage capacitor $C_S$. As a result, a voltage represented by Expression 1 is applied between the source and the drain of the TFT, whereas a voltage represented by Expression 2 is applied between the gate and the drain of the TFT.

Herein, $C_{GD}$ is a gate-drain parasitic capacitance; $V_{GH}$ is a high level voltage of a gate line; $C_{LC}$ is a liquid capacitance; $V_G^L$ is a low level voltage of a gate line; $C_S$ is a capacitance value of the storage capacitor; $V_D$ is a pixel signal voltage; and $V_S$ is a source signal voltage.

$$V_{DS}^{max} = V_D - V_S + \frac{C_S}{C_{GD} + C_{LC} + C_S} \cdot (V_G^H - H_G^L) \quad \text{[Expression 1]}$$

$$V_{GD}^{max} = V_{GL} + \frac{C_S}{C_{GD} + C_{LC} + C_S} \cdot (V_G^H - V_G^L) \quad \text{[Expression 2]}$$

For example, when the area of the pixel electrode is 100 μm×100 μm; the liquid crystal relative dielectric constant is 5; the cell gap is 5 μm; the L/W of the TFT (L=length and W=width) is 10 μm/10 μm; and the thickness of a gate insulation film is 100 nm (in terms of $SiO_2$), the gate-drain parasitic capacitance $C_{GD}$ is 0.018 pF and the liquid crystal capacitance $C_{LC}$ is 0.088 pF. Accordingly, assuming that the capacitance value of the storage capacitor $C_S$ is 0.2 pF; the high level of the gate line $V_G^H$ is 12V; the low level voltage $V_G^L$ of the gate line is -15V; and the source signal voltage $V_S$ is ±5V, when the pixel signal voltage $V_D$ is 5V and the source signal voltage $V_S$ is -5V in the worst cases (that is, timing A and B shown in FIGS. 10A and 10B, respectively), the source-drain voltage $V_{DS}^{max}$ is 27.6V. Such a voltage level is much greater than a generally applied maximum voltage $V_D$-$V_S$ (within a range of about ±10V). Thus, the possibility exists for such occurrences as an increase in the OFF current and reduced reliability.

FIG. 11 shows one example of TFT characteristics. As the source-drain voltage $V_{DS}$ increases, there is a tendency that a region where the OFF current $I_D$ is small with respect to the gate-source voltage $V_{GS}$ is abruptly reduced and the OFF current $I_D$ increases. In particular, when the absolute value of the gate-source voltage $V_{GS}$ becomes large, the OFF current $I_D$ remarkably increases. Therefore, when the source-drain voltage $V_{DS}$ becomes high, the following fact becomes especially problematic. Since several ten thousands to several hundred thousands of TFTs are formed in a panel display area, there exist TFTs in which the OFF current $I_D$ abruptly increases as compared to that in the neighboring TFTs when the source-drain voltage $V_{DS}$ becomes high whereas no problem is imposed on the OFF current $I_D$ in the case of a generally applied voltage level ($V_{DS}$ is about 10V or less). In such TFTs, when the source-drain voltage $V_{DS}^{max}$ becomes high in a horizontal period (about 30 $\mu$s or less), the leakage current increases, thereby reducing the pixel voltage. As a result, the pixel voltage cannot be held. Thus, a display defect such as a bright spot or the like occurs in the pixels connected to such TFTs.

For example, as shown in FIG. 10A, the case in which scanning of the gate line G(n-1) constituting the other electrode of the storage capacitor $C_S$ provided in the pixel driven by the nth gate line G(n) is performed immediately before the writing of a pixel in the nth gate line G(n) will be described firstly. In this case, the pixel signal voltage $V_D$(n) is influenced by a change in the voltage of the gate G(n-1) at the timing A, thereby becoming a large voltage. Thus, as described above, a reduction in the pixel voltage is caused by the leakage current, resulting in a reduction by an amount 1001. However, since the writing of a signal in the gate line G(n) is performed immediately after the completion of the writing of a signal in the gate line G(n-1), problems regarding the display are not significant.

Next, as shown in FIG. 10B, the case where the gate lines are scanned in a direction opposite of the case shown in FIG. 10A, i.e., the case where scanning of the gate line G(n-1) constituting the other electrode of the storage capacitor $C_S$ provided in the pixel driven by the nth gate line G(n) is performed immediately after the writing of a pixel in the nth gate line G(n) will be described. In this case, the pixel signal voltage $V_D$(n) is influenced by a change in the voltage of the gate line G(n-1) at the timing B, thereby becoming a large voltage. Thus, as described above, a reduction in the pixel voltage is caused by the leakage current, resulting in a reduction by an amount 1002. Accordingly, the pixel voltage cannot be held and a display defect such as a bright spot or the like may thus result.

In recent years, a projector is designed so that it can be installed on a desk and it can be also suspended from a ceiling. Therefore, gate lines are required to have a two-way scanning direction. In the case where the gate lines have a two-way scanning direction, a problem such as described above occurs. In order to overcome this problem, it is necessary to set the low level voltage $V_G^L$ of the gate line within a range so as to cause no influences on the display. Due to variations in TFT characteristics, however, there is a limit in the setting of the low level voltage $V_G^L$ of the gate line. Thus, it is difficult to produce TFTs having predetermined characteristics in a stable manner, resulting in a reduction in a yield of the panel production. With regard to the a panel design, it is possible to reduce the size of the storage capacitor $C_S$. However, there is a limit due to the problem of the OFF current within a normal use range and the problem of picture quality.

As described above, according to the conventional $C_S$-on-gate structure, problems regarding reliability of the TFTs and holding of the pixel signals occur.

SUMMARY OF THE INVENTION

According to one aspect of the invention, an active matrix type liquid crystal display device includes: a plurality of data lines and a plurality of gate lines disposed in a lattice manner; and a pixel having a pixel transistor, a pixel electrode, and a storage capacitor, the pixel being disposed at a intersection between the data line and the gate line. The storage capacitor includes electrodes connected to the pixel electrode and electrodes connected to a plurality of gate lines, none of which is a gate line for driving the pixel.

In one embodiment of the invention, the plurality of gate lines are structured so as to be divided between a gate line whose scanning order is before the gate line for driving the pixel and a gate line whose scanning order is after the gate line for driving the pixel.

In another embodiment of the invention, the gate line has a one-way scanning direction, and the plurality of gate lines are gate lines whose scanning is performed prior to that of the pixel.

In still another embodiment of the invention, the gate line has a two-way scanning direction, and the plurality of gate lines are constituted of a gate line disposed before the pixel and a gate line disposed after the pixel.

In still yet another embodiment of the invention, a plurality of gate lines are simultaneously selected, and the plurality of gate lines each constituting one electrode of the storage capacitor are gate lines which are not simultaneously selected.

In still yet another embodiment of the invention, the storage capacitor employs a gate insulation film of the pixel transistor as an insulation layer.

According to the liquid crystal display device of the present invention, the storage capacitor includes the electrodes connected to the pixel electrode and the electrodes connected to a plurality of gate lines, none of which is the gate line for driving the pixel. As a result, the capacitance of the storage capacitor $C_S$ per gate line becomes 1/(the number of the plurality of gate lines) of that in the conventional $C_S$-on-gate structure in which one of electrodes constituting the storage capacitor $C_S$ is connected to one gate line. As can be appreciated from Expression 1, the amount of a change in the voltage of the gate line due to the presence of the storage capacitor $C_S$ is applied to the pixel electrode. Therefore, the voltage rise due to the presence of the storage capacitor becomes 1/(the number of the plurality of gate lines) of that in the conventional $C_S$-on-gate structure in which one of electrodes constituting the storage capacitor $C_S$ is connected to one gate line. Moreover, since each of the gate lines is sequentially selected at a respectively different period of time, a voltage rise due to the presence of each of the storage capacitors $C_S$ occurs at a respectively different period of time. As a result, the total amount of the voltage increases due to the presence of all the storage capacitors $C_S$ can be reduced to be 1/(the number of the plurality of gate lines) of that in the conventional $C_S$-on-gate structure in which one of electrodes constituting the storage capacitor $C_S$ is connected to one gate line.

Moreover, the above-described plurality of gate lines are structured so as to be divided between a gate line whose scanning order is before the gate line for driving the pixel and a gate line whose scanning order is after the gate line for driving the pixel. As a result, the voltage increases due to the presence of the storage capacitors $C_S$ are also divided so as to occur before and after driving the pixel. Thus, effects on the pixel voltage signal due to a rise in the voltage resulting from the presence of the storage capacitor $C_S$ connected to the gate line before driving the pixel are eliminated since the rewriting of the signal is performed by driving the pixel immediately after the voltage rise. Accordingly, the total amount of the voltage increases due to the presence of all the storage capacitors $C_S$ is reduced to be 1/(the number of the plurality of gate lines) of that in the conventional $C_S$-on-gate structure in which one of the electrodes constituting the storage capacitor $C_S$ is connected to one gate line. In addition, effects on the display can be further reduced. In this case, even when scanning of the gate lines is performed in the opposite direction, the pixel voltage signal results in the same condition as that in the forward scanning. Thus, the liquid crystal display device having this structure can be applied to various things regardless of its scanning order.

Furthermore, according to the liquid crystal. display device in which the gate lines have a one-way scanning direction, the plurality of gate lines are gate lines whose scanning orders are prior to that of the pixel. As a result, effects on the pixel voltage signal due to a voltage rise resulting from the presence of the storage capacitor $C_S$ connected to the gate line before driving the pixel are eliminated since the rewriting of the signal is performed by driving the pixel immediately after the voltage rise. Thus, a period of time between a point when the rewriting of the signal by driving the pixel is completed and a point when subsequent voltage change due to the storage capacitor $C_S$ occurs can be prolonged, thereby reducing effects on the display.

Also, according to the liquid crystal display device in which the gate lines have a two-way scanning direction, the plurality of gate lines are constituted of a gate line disposed before the pixel and a gate line disposed after the pixel. As a result, in both cases of the forward scanning and the reverse scanning of the gate lines, voltage increases due to the storage capacitors $C_S$ are divided so as to occur before and after driving the pixel. Accordingly, the pixel voltage signal in the case of the forward scanning and that in the case of the reverse scanning become identical. Thus, the same display quality can be realized even when the scanning direction is switched.

Moreover, according to the liquid crystal display device in which a plurality of gate lines are simultaneously selected, the above-described plurality of gate lines each constituting one electrode of the storage capacitor are constituted of gate lines which are not simultaneously selected. As a result, a reduction in a voltage change due to the storage capacitor $C_S$ can be realized as in the case where driving of gate lines is performed by selecting one gate line at a time.

Furthermore, the storage capacitor employs a gate insulation film of the pixel transistor as an insulation layer. As a result, the gate insulation film has a smaller thickness as compared to a conventional structure employing an interlayer insulation film in the lower layer of the pixel electrode. Consequently, an area required for the storage capacitor $C_S$ can be made smaller than that required for the conventional storage capacitor $C_S$. Accordingly, an aperture ratio of the pixel can be made larger due to a reduction in size of the storage capacitor $C_S$, thereby improving brightness of the liquid crystal display device.

Thus, the invention described herein makes possible the advantage of providing a liquid crystal display device having a $C_S$ structure capable of realizing high reliability and a high holding rate while making use of a high aperture ratio of a $C_S$-on-gate structure.

This and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative, but non-limiting examples with reference to the accompanying drawings.

In Embodiment 1 of the present invention, the case in which the gate lines constituting the other electrodes of the storage capacitors $C_S$ provided in a pixel driven by a gate line are the two gate lines disposed immediately before the pixel driven by the gate line will be described. In Embodiment 2 of the present invention, the case in which the gate lines constituting the other electrodes of the storage capacitors $C_S$ are the two gate lines disposed before and after the pixel driven by the gate line will be described. In the Comparative Example, a gate line constituting the other electrode of the storage capacitor $C_S$ provided in a pixel driven by a gate line is one gate line disposed immediately before the pixel driven by the gate line will be described. A fabrication process of a liquid crystal display device described below is common to both of Embodiment 1 and Embodiment 2.

Hereinafter, the fabrication process of the liquid crystal display device according to the present invention will be described with reference to FIGS. 7A through 7F.

Figure 7A:
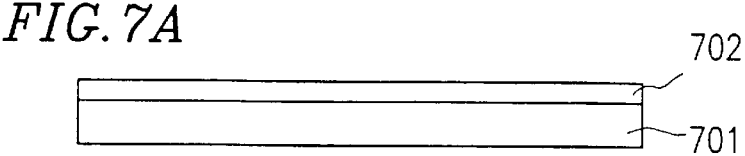
FIGS. 7A through 7F are views showing steps of fabricating a liquid crystal display device according to the present invention.

First, as shown in FIG. 7A, a SiO$_2$ film (not shown) is formed as a basecoat layer on a glass plate 701 by sputtering. Then, an amorphous silicon (hereinafter, referred to simply as "a-Si") film 702 is formed so as to have a thickness of about 50 nm by an LPCVD method using a Si$_2$H$_6$ at a substrate temperature of about 450° C.

Figure 7B:
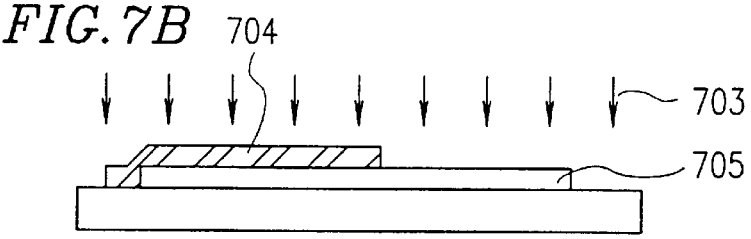

Next, as shown in FIG. 7B, a polycrystalline silicon (hereinafter, referred to simply as "poly-Si") film 705 is formed by an excimer laser annealing. Then, the patterning of the poly-Si film 705 is performed. After a TFT region is protected by a resist 704, phosphorus ions 703 are injected into a storage capacitor C$_S$ region by ion implantation at a concentration of about 1×10$^{15}$ cm$^{-2}$.

Figure 7C:
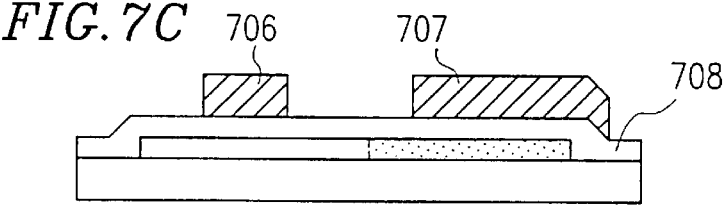

Then, as shown in FIG. 7C, after the resist 704 is removed, a SiO$_2$ film is formed as a gate insulation film 708 so as to have a thickness of about 100 nm using a sputtering technique. Thereafter, densification of the SiO$_2$ film is performed by annealing at a temperature of about 600° C. Next, after a Ta film is formed by sputtering, the Ta film is patterned so as to serve as a gate electrode 706 and also as a storage capacitor C$_S$ electrode 707.

Figure 7D:
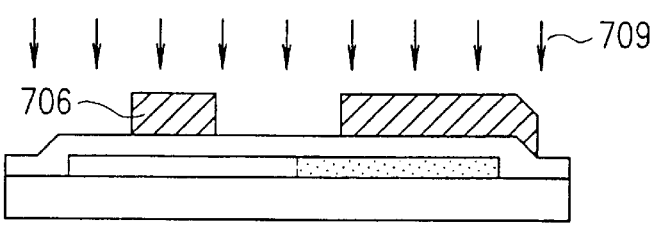

Thereafter, as shown in FIG. 7D, phosphorus ions 709 are implanted into the TFT region in a self-alignment manner at a concentration of about 1×10$^{15}$ cm$^{-2}$ using the gate electrode 706 as a mask.

Figure 7E:
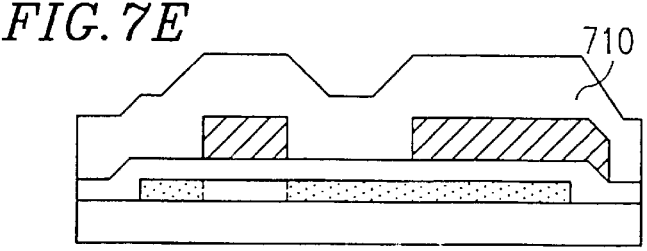

Then, as shown in FIG. 7E, a SiO$_2$ film is formed as an interlayer insulation film 710 by sputtering so as to have a thickness of about 400 nm. Thereafter, annealing for activating the SiO$_2$ film is performed at a temperature of about 600° C.

Figure 7F:
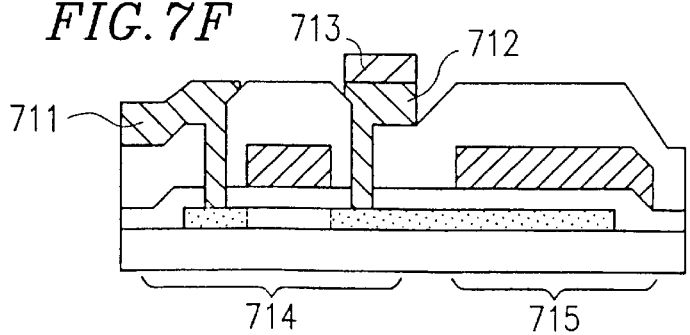
Figure 8:
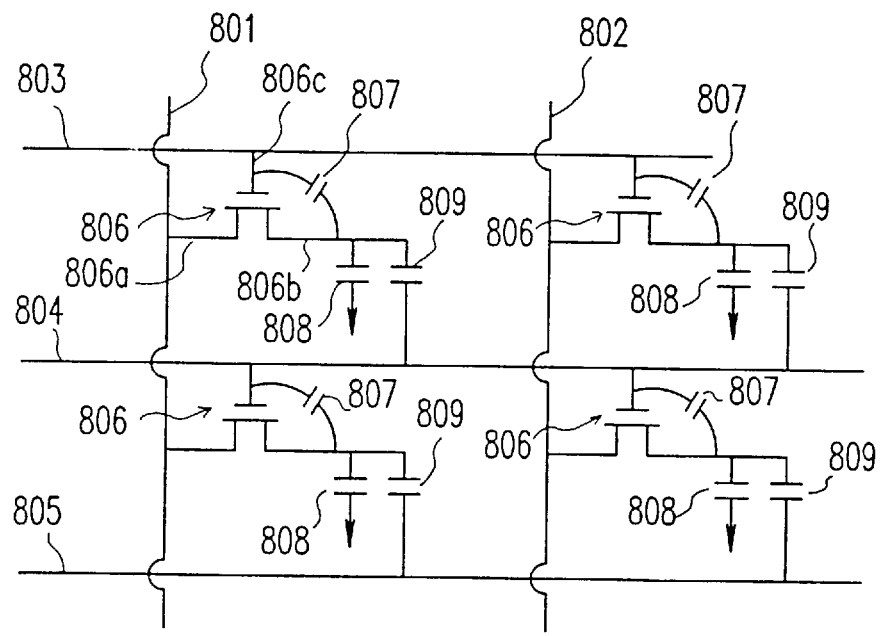
FIG. 8 shows an equivalent circuit of a $C_S$-on-gate structure in a conventional liquid crystal display device.
Figure 9:
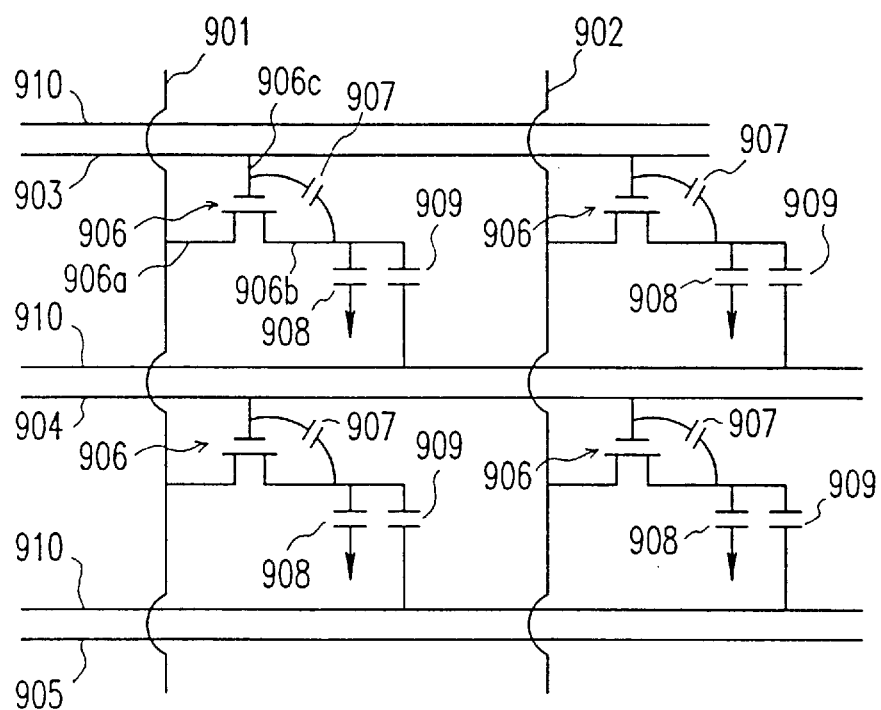
FIG. 9 shows an equivalent circuit of a $C_S$ common structure in a conventional liquid crystal display device.
Figure 10A:
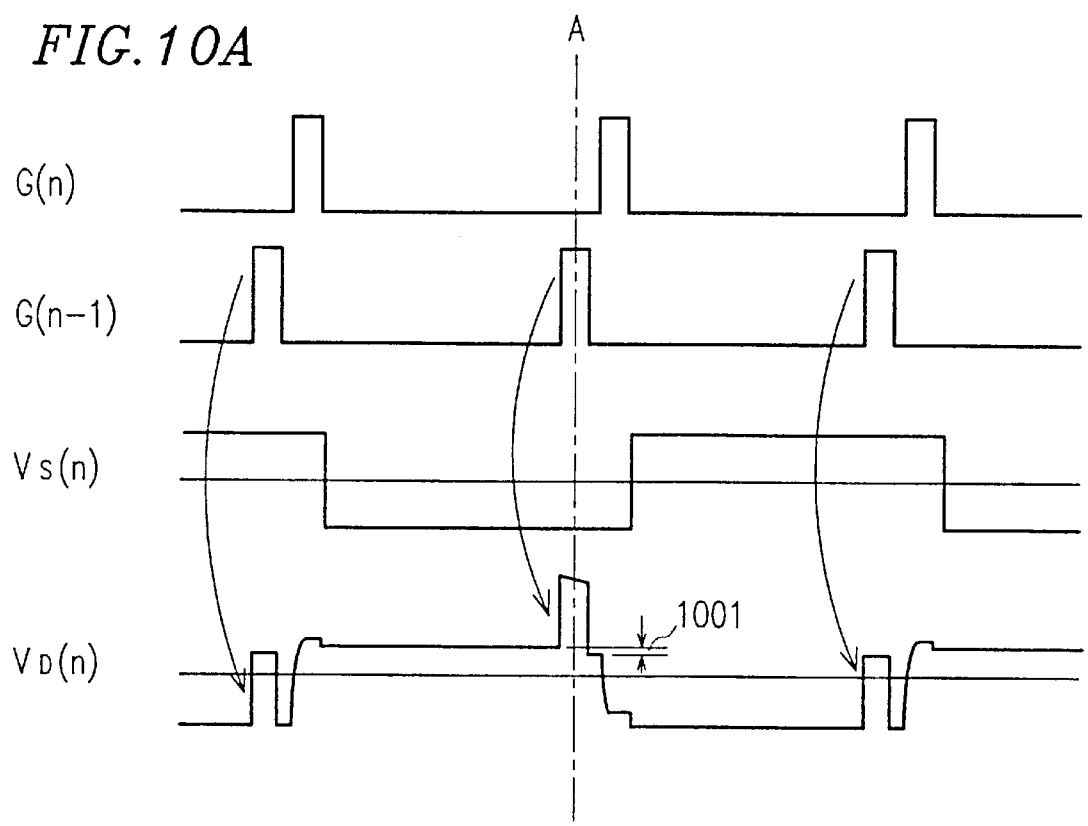
FIGS. 10A and 10B are timing charts for driving the liquid crystal display device having the conventional $C_S$-on-gate structure.
Figure 10B:
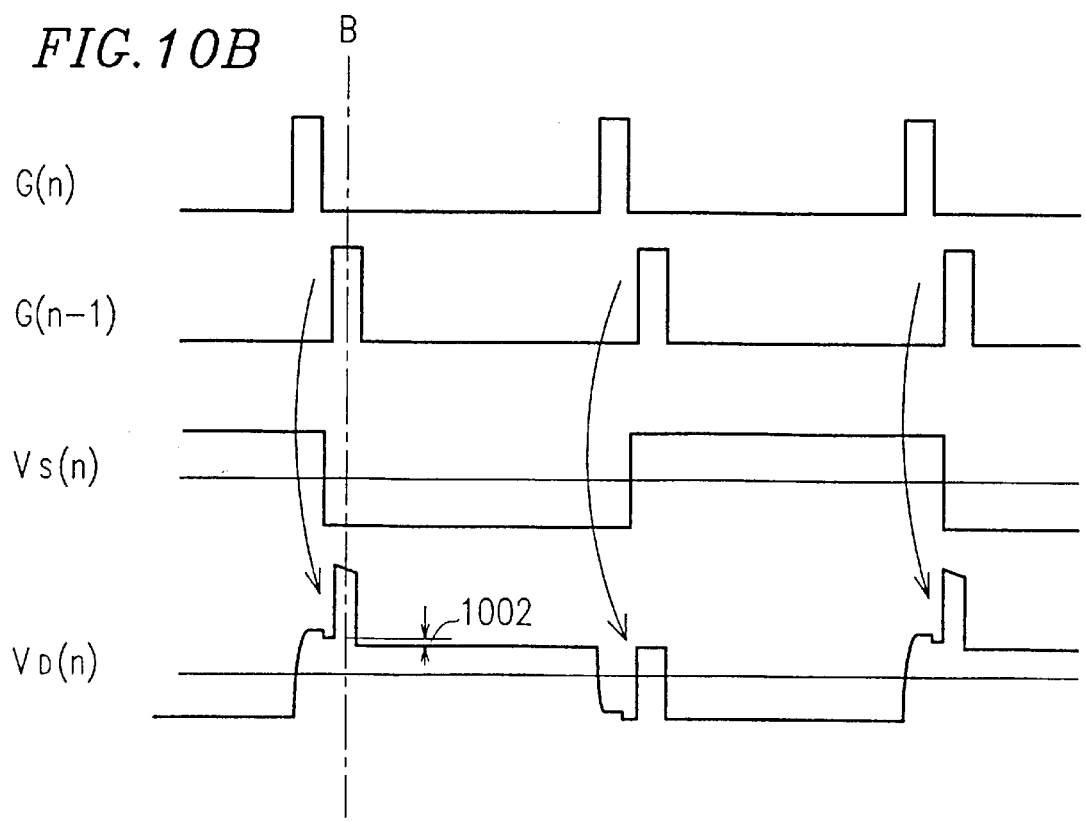
Figure 11:
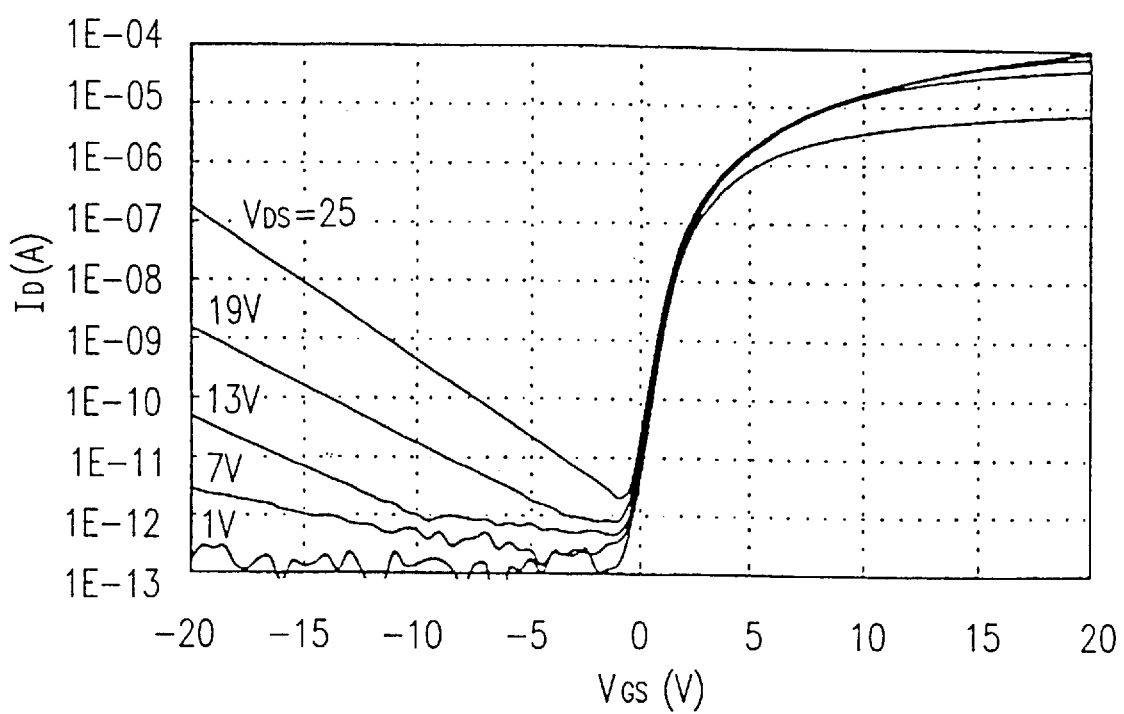
FIG. 11 shows characteristics of a thin film transistor.

Thereafter, as shown in FIG. 7F, contact holes are formed and then an Al film is formed by a sputtering technique. The Al film is patterned so as to form a source line 711 and a drain electrode 712. Next, an ITO film is formed by sputtering. The ITO film is then patterned so as to form a pixel electrode 713. In this manner, a TFT region 714 and a storage capacitor C$_S$ region 715 are formed.

Next, an alignment film (not shown) is formed on the thus fabricated substrate. After performing a rubbing treatment on the alignment film, the substrate is attached to a counter substrate (not shown). Then, a liquid crystal material is injected between the two substrates, and finally, a driver IC (not shown) is mounted. In this manner, the liquid crystal display device according to the present invention is fabricated.

As described above, as an insulating film constituting the storage capacitor C$_S$, the gate insulation film is employed. With such a structure, the thickness of the gate insulation film becomes thinner as compared with the conventional structure in which an interlayer insulation film of a lower layer of a pixel electrode is employed. As a result, the area required to obtain the storage capacitor C$_S$ can be made smaller than that in the conventional structure. Accordingly, the aperture ratio of the pixel can be made larger due to a reduction in size of the storage capacitor C$_S$, thereby improving brightness of the liquid crystal display device.

(Embodiment 1)

Figure 1:
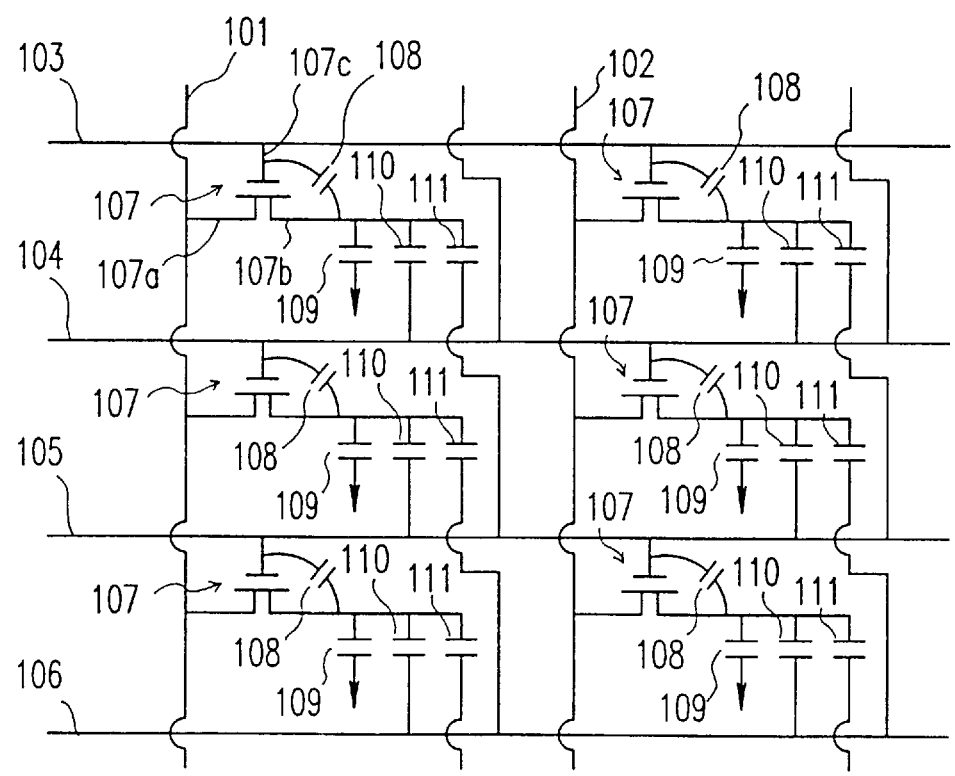
FIG. 1 shows an equivalent circuit of a liquid crystal display device according to Embodiment 1 of the present invention.
Figure 2:
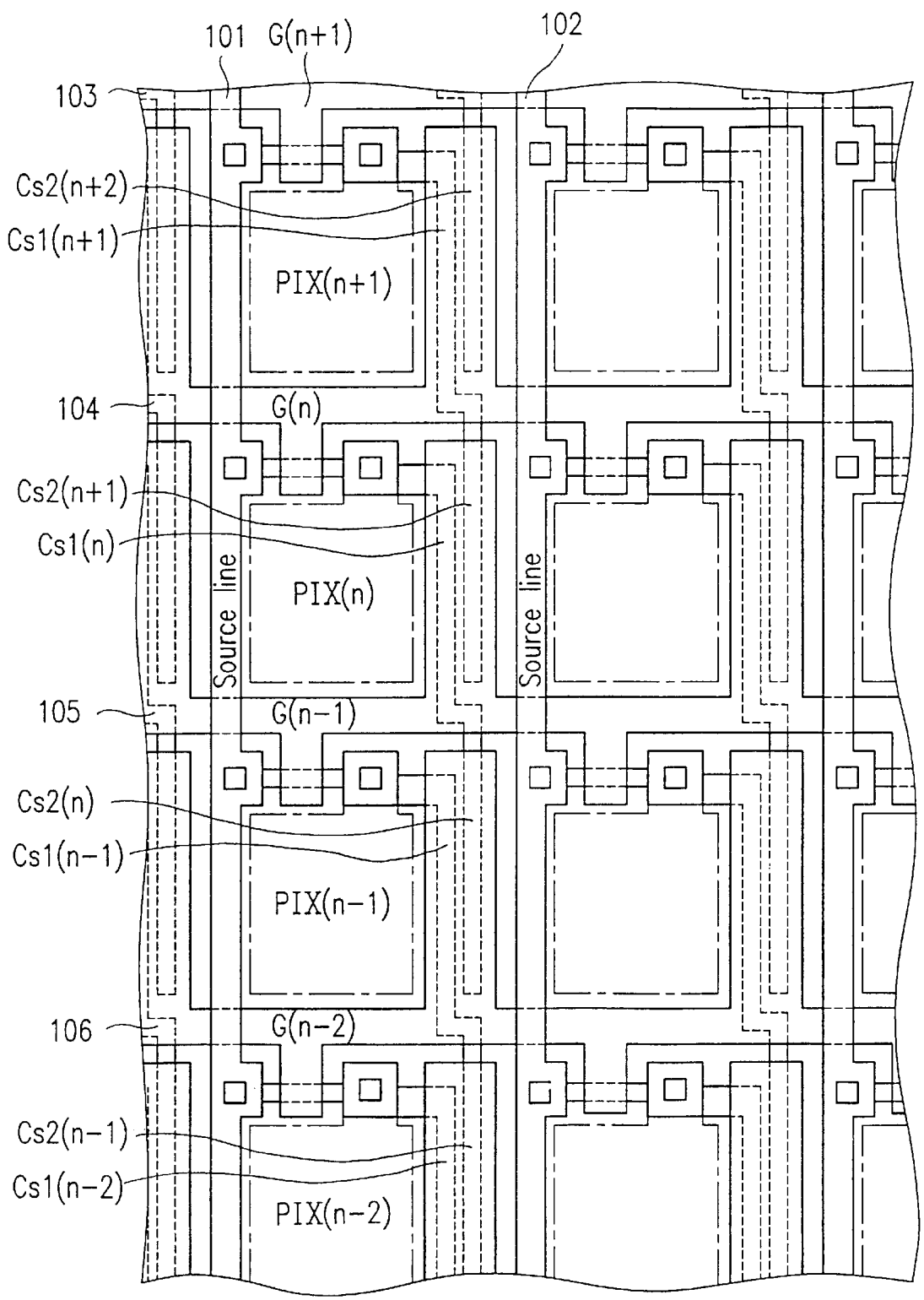
FIG. 2 is a plan view showing a structure of the liquid crystal display device according to Embodiment 1 shown in FIG. 1.
Figure 3:
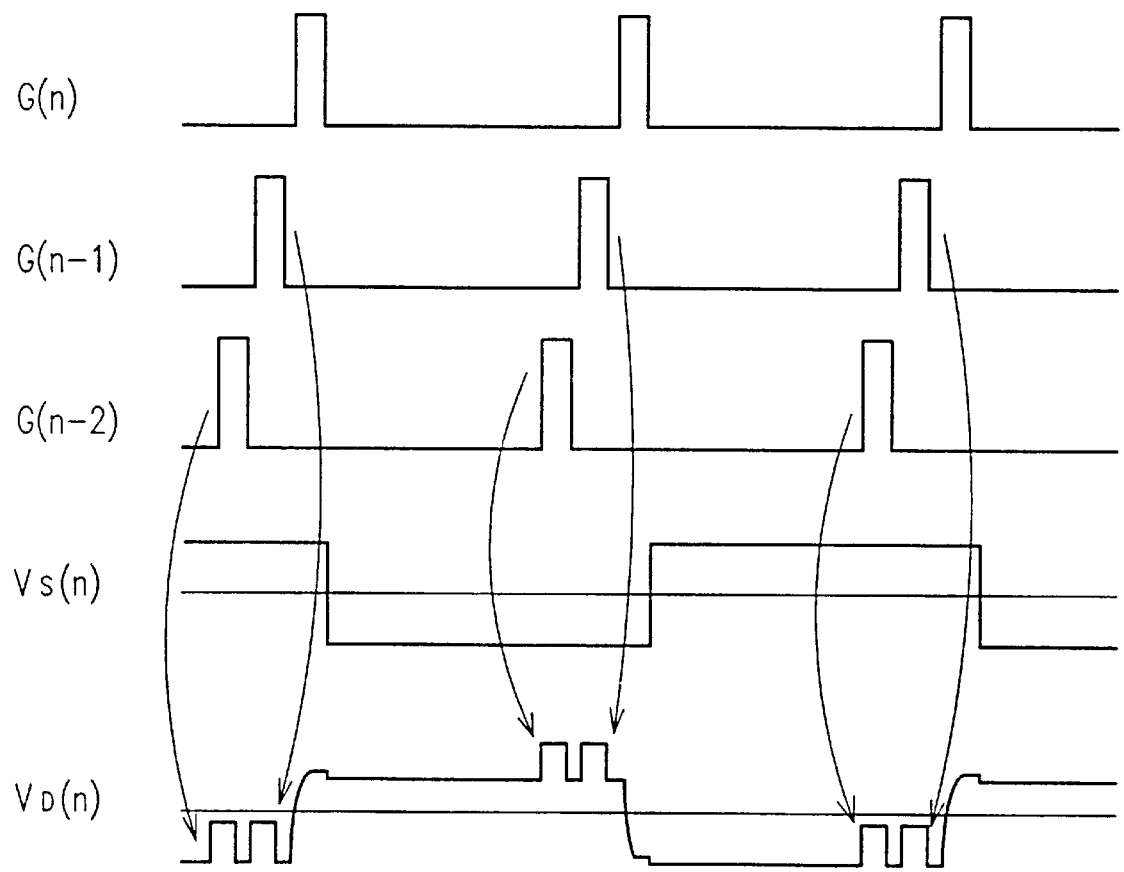
FIG. 3 is a timing chart for driving the liquid crystal display device according to Embodiment 1 of the present invention.

In Embodiment 1 of the present invention, the case in which gate lines constituting the other electrodes of storage capacitors C$_S$ provided in a pixel driven by a gate line are two gate lines disposed immediately before the pixel driven by the gate line. FIG. 1 shows an equivalent circuit according to Embodiment 1 of the present invention. FIG. 2 is a plan view showing a structure of Embodiment 1 shown in FIG. 1. FIG. 3 is a timing chart for driving the structure of Embodiment 1 according to the present invention.

As shown in FIG. 1, in a liquid crystal display device according to Embodiment 1 of the present invention, each pixel includes a TFT 107, a liquid crystal capacitor 109, a first storage capacitor (C$_S$1) 110 and a second storage capacitor (C$_S$2) 111. Herein, each of data lines 101 and 102 is connected to respective one electrode of the liquid crystal capacitor 109, the first storage capacitor 110 and the second storage capacitor 111 via a source electrode 107a and a drain electrode 107b of the TFT 107. Gate lines 103 to 106 are connected to gate electrodes 107c of the TFTs 107, respectively. The other electrode of the liquid crystal capacitor 109 is connected to a counter electrode (not shown) with a liquid crystal layer interposed therebetween. The other electrodes of the storage capacitors are connected to adjacent gate lines, neither of which is the one for driving the pixel. In Embodiment 1 of the present invention, the first storage capacitor 110 and the second storage capacitor 111 are connected to different gate lines. More specifically, the first storage capacitor 110 in a pixel connected to the gate line 103 is connected to the gate line 104, and the second storage capacitor 111 in the pixel connected to the gate line 103 is connected to the gate line 105. Similarly, the first storage capacitor 110 in a pixel connected to the gate line 104 is connected to the gate line 105 and the second storage capacitor 111 in the pixel connected to the gate line 104 is connected to the gate line 106. The first storage capacitor 110 and the second storage capacitor 111 serve to minimize leakage currents of the liquid crystal capacitor 109 and the TFT 107, to minimize the change in a pixel voltage caused by a parasitic capacitor C$_{GD}$ 108 formed between the gate electrode 107c and the drain electrode 107b of the TFT 107, and to minimize the effects of display data dependency in the liquid crystal capacitor 109 and the like.

The configuration of a gate line, a pixel electrode and two storage capacitors will be further described with reference to FIG. 2.

A pixel connected to a gate line G(n) will be described. The pixel connected to the gate line G(n) includes a pixel electrode PIX(n), a first storage capacitor C$_S$1(n) 110 and a second storage capacitor C$_S$2(n) 111. The first storage capacitor C$_S$1(n) includes a region extending from the gate line G(n–1) toward the pixel electrode PIX(n) and a region extending from a TFT drain region for driving the pixel electrode PIX(n) via a gate insulation film. (See the storage capacitor C$_S$ region 715 in FIG. 7F.) On the other hand, the second storage capacitor C$_S$2(n) includes a region extending from a gate line G(n–2) towards a pixel electrode PIX(n–1) and a region extending from the TFT drain region for driving the pixel electrode PIX(n) and also extending from the first storage capacitor C$_S$1(n). In this manner, the storage capacitors are formed so as to be connected to the adjacent two gate lines, respectively. As a result, the capacitance of the storage capacitor per gate line can be made half of that in the conventional example. The other pixels are configured in the same manner as that described above, thereby completing the liquid crystal display device according to Embodiment 1 of the present invention.

Next, the case when the liquid crystal display device according to Embodiment 1 of the present invention is operated will be described with reference to FIGS. 2 and 3.

As shown in FIG. 3, the case in which scanning of the gate line G(n–1) constituting the other electrode of the first storage capacitor C$_S$1(n) (FIG. 2) provided in the pixel driven by the nth gate line G(n) and the gate line G(n–2) constituting the other electrode of the second storage capacitor C$_S$2(n) (FIG. 2) is performed immediately before the writing of a pixel in the nth gate line G(n) will be described.

In this case, since the two storage capacitors are formed so as to be connected to two adjacent gate lines, respectively, the capacitance of the storage capacitor per gate line becomes a half of that in the conventional case. Accordingly, a pixel signal voltage $V_D(n)$ has a region which receives the influence of a voltage change in the gate line G(n−1) and a region which receives the influence of a voltage change in the gate line G(n−2), thereby reducing the rise in the voltage due to the presence of the storage capacitors. As a result, a reduction in the pixel voltage resulting from the leakage current caused by the temporary rise in the pixel voltage due to the storage capacitors can be suppressed, thereby further improving the reliability of the liquid crystal display device.

In Embodiment 1 of the present invention, the case in which scanning of the gate line G(n−1) constituting the other electrode of the first storage capacitor $C_S1$ (FIG. 2) provided in the pixel driven by the nth gate line G(n) and the gate line G(n−2) constituting the other electrode of the second storage capacitor $C_S2(n)$ (FIG. 2) is performed immediately before the writing of a pixel in the nth gate line G(n) is described. However, it is apparent that the effect of reducing a rise in the voltage due to the presence of the storage capacitors can be obtained also in the case where scanning of the gate line G(n−1) constituting the other electrode of the first storage capacitor $C_S1(n)$ (FIG. 2) provided in the pixel driven by the nth gate line G(n) and the gate line G(n−2) constituting the other electrode of the second storage capacitor $C_S2(n)$ (FIG. 2) is performed immediately after the writing of a pixel in the nth gate line G(n).

(Embodiment 2)

Figure 4:
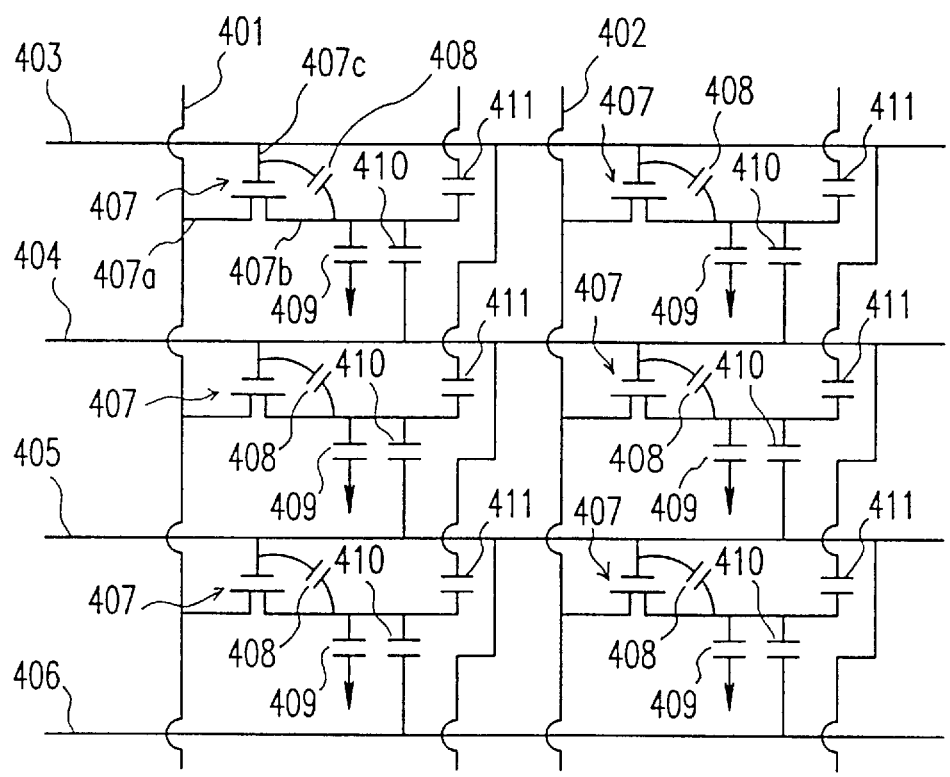
FIG. 4 is an equivalent circuit of a liquid crystal display device according to Embodiment 2 of the present invention.
Figure 5:
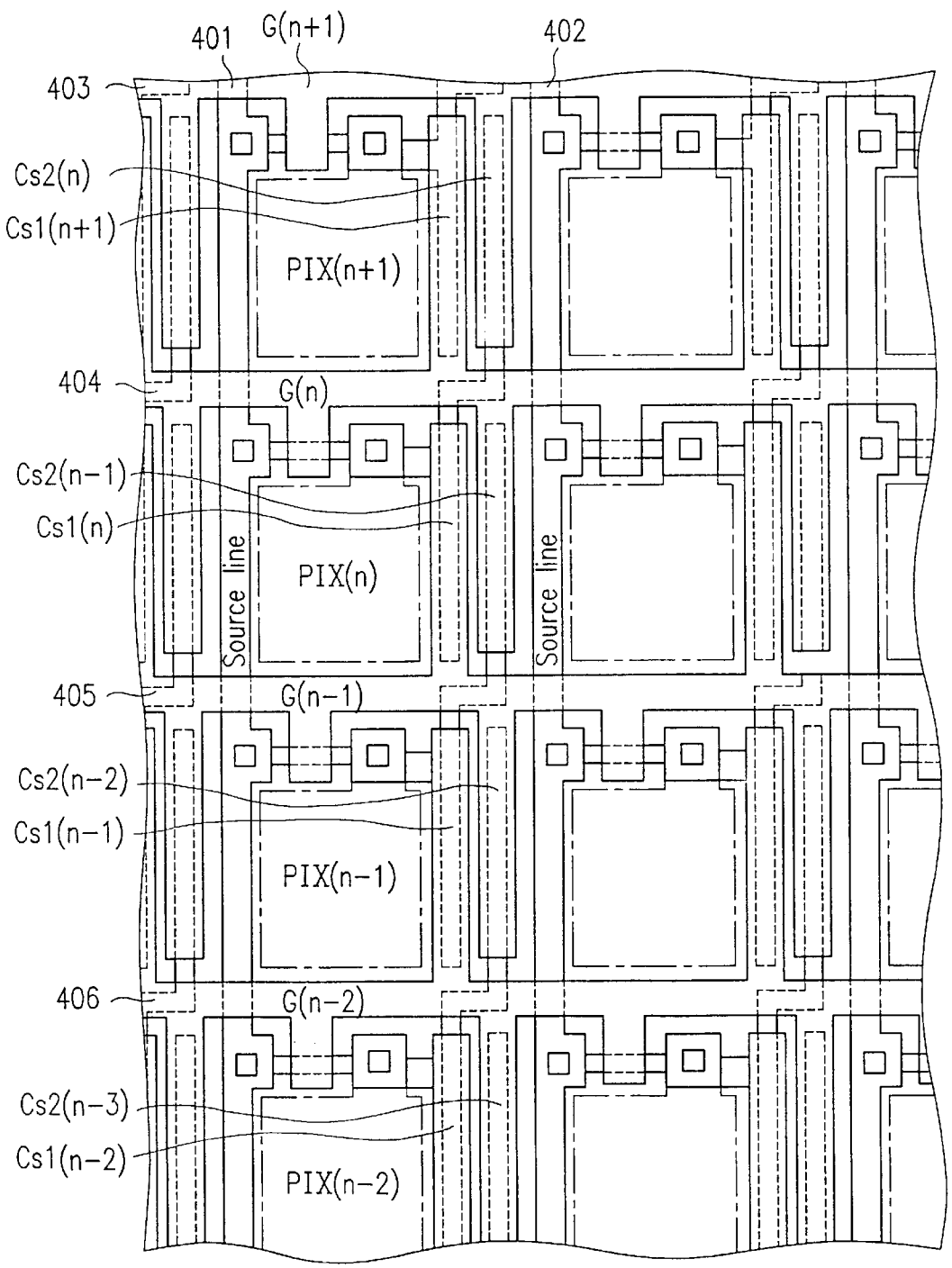
FIG. 5 is a plan view showing a structure of the liquid crystal display device of Embodiment 2 shown in FIG. 4.
Figure 6:
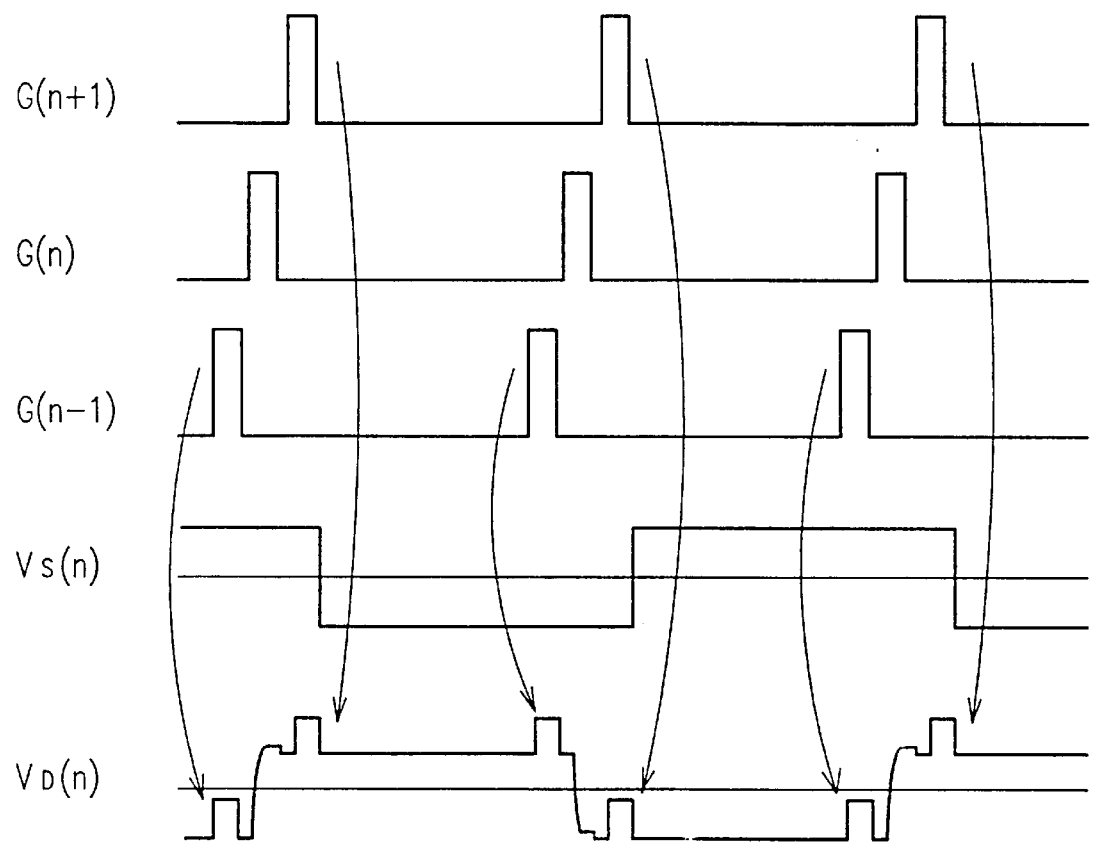
FIG. 6 is a timing chart for driving the liquid crystal display device of Embodiment 2 according to the present invention.

In Embodiment 2 of the present invention, the case in which gate lines constituting the other electrodes of the storage capacitors $C_S$ provided in a pixel driven by a gate line are two gate lines respectively disposed before and after the pixel driven by the gate line. FIG. 4 shows an equivalent circuit according to Embodiment 2 of the present invention. FIG. 5 is a plan view showing a structure of Embodiment 2 shown in FIG. 4. FIG. 6 is a timing chart for driving the structure of Embodiment 2 according to the present invention.

As shown in FIG. 4, in a liquid crystal display device according to Embodiment 2 of the present invention, each pixel includes a TFT 407, a liquid crystal capacitor 409, a first storage capacitor 410 and a second storage capacitor 411. Herein, each of data lines 401 and 402 is connected to respective one electrode of the liquid crystal capacitor 409, the first storage capacitor 410 and the second storage capacitor 411 via a source electrode 407a and a drain electrode 407b of the TFT 407. Gate lines 403 to 406 are connected to gate electrodes 407c of the TFTs 407, respectively. The other electrodes of the liquid crystal capacitor 409 is connected to a counter electrode (not shown) with a liquid crystal layer interposed therebetween. The other electrodes of the storage capacitors are connected to adjacent gate lines, neither of which is the one for driving the pixel. In Embodiment 2 of the present invention, the first storage capacitor 410 and the second storage capacitor 411 are connected to different gate lines. More specifically, the first storage capacitor 410 in a pixel connected to the gate line 404 is connected to the gate line 405, and the second storage capacitor 411 in the pixel connected to the gate line 404 is connected to the gate line 403. Similarly, the first storage capacitor 410 in a pixel connected to the gate line 405 is connected to the gate line 406 and the second storage capacitor 411 in the pixel connected to the gate line 405 is connected to the gate line 404. The first storage capacitor 410 and the second storage capacitor 411 serve to minimize leakage currents of the liquid crystal capacitor 409 and the TFT 407, to minimize the change in a pixel voltage caused by a parasitic capacitor $C_{GD}$ 408 formed between the gate electrode 407c and the drain electrode 407b of the TFT 407, and to minimize effects of display data dependency in the liquid crystal capacitor 409 and the like.

Configuration of a gate line, a pixel electrode and two storage capacitors will be further described with reference to FIG. 5.

Hereinafter, a pixel connected to a gate line G(n) will be described. The pixel connected to the gate line G(n) includes a pixel electrode PIX(n), a first storage capacitor $C_S1(n)$ 410 and a second storage capacitor $C_S2(n)$ 411. The first storage capacitor $C_S1(n)$ includes a region extending from the gate line G(n−1) towards the pixel electrode PIX(n) and a region extending from a TFT drain region for driving the pixel electrode PIX(n) via a gate insulation film. (See the storage capacitor $C_S$ region 715 in FIG. 7F.) On the other hand, the second storage capacitor $C_S2(n)$ includes a region extending from a gate line G(n+1) towards a pixel electrode PIX(n+1) and a region extending from the TFT drain region for driving the pixel electrode PIX(n) via the gate insulation film and also extending from the first storage capacitor $C_S1(n)$. In this manner, the storage capacitors are formed so as to be connected to the adjacent two gate lines, respectively. As a result, the capacitance of the storage capacitor per gate line can be made half of that in the conventional example. The other pixels are configured in the same manner as that described above, thereby completing the liquid crystal display device according to Embodiment 2 of the present invention.

Next, the case when the liquid crystal display device according to Embodiment 2 of the present invention is operated will be described with reference to FIGS. 5 and 6.

As shown in FIG. 6, the case in which scanning of the gate line G(n−1) constituting the other electrode of the first storage capacitor $C_S1(n)$ (FIG. 5) provided in the pixel driven by the nth gate line G(n) and the gate line G(n+1) constituting the other electrode of the second storage capacitor $C_S2(n)$ (FIG. 5) is performed before and after the writing of a pixel in the nth gate line G(n), respectively, will be described. In this case, since the two storage capacitors are formed so as to be connected to two adjacent gate lines, respectively, the capacitance of the storage capacitor per gate line becomes half of that in the conventional example. Accordingly, the pixel signal voltage $V_D(n)$ has a region which receives the influence of a voltage change in the gate line G(n−1) and a region which receives the influence of a voltage change in the gate line G(n+1), thereby reducing the rise in the voltage due to the presence of the storage capacitors. As a result, a reduction in the pixel voltage resulting from the leakage current caused by the temporary rise in the pixel voltage due to the storage capacitors can be suppressed, thereby further improving the reliability of the liquid crystal display device.

In Embodiment 2 of the present invention, as shown in FIG. 6, the case in which scanning of the gate line G(n−1) constituting the other electrode of the first storage capacitor $C_S1(n)$ (FIG. 5) provided in the pixel driven by the nth gate line G(n) and the gate line G(n+1) constituting the other electrode of the second storage capacitor $C_S2(n)$ (FIG. 5) is performed before and after the writing of a pixel in the nth gate line G(n), respectively, is described. Herein, as shown in FIG. 5, the first storage capacitor $C_S1(n)$ and the second storage capacitor $C_S2(n)$ are disposed in a symmetrical manner with respect to the nth gate line G(n). As is apparent from this structure, the effect of reducing a rise in the voltage due to the presence of the storage capacitors can be obtained also in the case where scanning of the gate line G(n'11) and the gate line G(n+1) is performed in the order opposite of the scanning order described above.

Thus, reliability and display quality can be improved in the liquid crystal display device in which the gate lines have a two-way scanning direction.

(Comparative Example)

Figure 12:
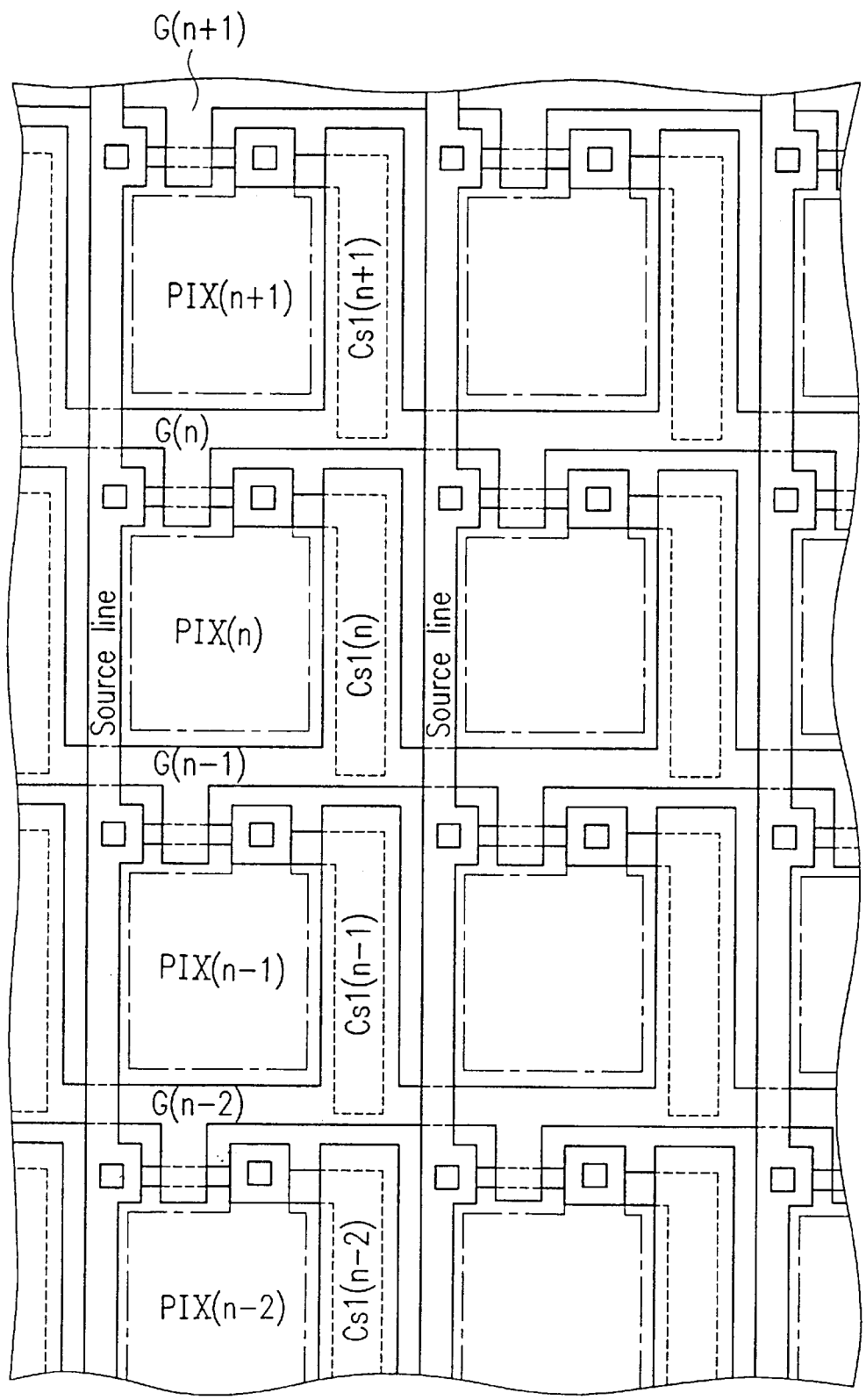
FIG. 12 is a plan view showing a configuration of a $C_S$-on-gate structure of a liquid crystal display device according to the Comparative Example.

Next, a configuration of gate lines, pixel electrodes, and storage capacitors in a $C_S$-on-gate structure of Comparative Example will be described with reference to FIG. 12. Herein, the case in which a gate line constituting the other electrode of a storage capacitor $C_S$ provided in a pixel driven by a gate line is a gate line disposed immediately before the pixel driven by the gate line will be described.

Hereinafter, a pixel connected to an nth gate line G(n) will be described. The pixel connected to the nth gate line G(n) includes a pixel electrode PIX(n) and a storage capacitor $C_S1(n)$. The storage capacitor $C_S1(n)$ includes a region extending from a gate line G(n−1) towards the pixel electrode PIX(n) and a region extending from a TFT drain region for driving the pixel electrode PIX(n) via a gate insulation film (see the storage capacitor $C_S$ region 715 in FIG. 7F). The other pixels are configured in the same manner as that described above, thereby completing the liquid crystal display device according to Comparative Example.

(Example)

Hereinafter, characteristics of liquid crystal display devices each having the respective structure of the storage capacitors shown in Embodiment 1, Embodiment 2 and Comparative Example described above will be described.

Table 1 shows results of measuring a possible range of a low level driving voltage $V_G^L$ in each of the liquid crystal display devices according to Embodiment 1, Embodiment 2, and Comparative Example.

Herein, "a forward scanning" refers to the case in which scanning of the gate line G(n−1) constituting the other electrode of the storage capacitor $C_S$ provided in the pixel driven by the nth gate line G(n) is performed immediately before the writing of a pixel in the nth gate line G(n). "A reverse scanning" is performed in a direction opposite of the forward scanning and it refers to the case in which scanning of the gate line G(n−1) constituting the other electrode of the storage capacitor $C_S$ provided in the pixel driven by the nth gate line G(n) is performed immediately after the writing of a pixel in the nth gate line G(n).

TABLE 1

|  |  | Possible range of voltage $V_G^L$ | |
|---|---|---|---|
|  | Cs capacitance | Forward scanning | Reverse scanning |
| Embodiment 1 (Figure 2) | 0.18 pF | −7.5~−18.0 V | −7.8~−16.4 V |
| Embodiment 2 (Figure 5) | 0.16 pF | −7.3~−17.7 V | −7.5~−17.2 V |
| Comparative example (Figure 12) | 0.2 pF | −7.2~−16.5 V | −7.5~−9.6 V |

As shown in Table 1, in the case of the forward scanning, there are no significant differences in the possible ranges of low level driving voltages $V_{G\ L}$ among Embodiment 1, Embodiment 2, and Comparative Example. In the case of the reverse scanning, however, the range of the low level driving voltage $V_G^L$ of the gate line is small especially in the Comparative Example.

In the case of the liquid crystal display device in which the gate lines constituting the other electrodes of the storage capacitors $C_S$ provided in a pixel driven by a gate line are two gate lines disposed before and after the pixel driven by the gate line (i.e., in the case of Embodiment 2), the range of the low level driving voltage $V_G^L$ of the gate line in the forward scanning is substantially the same as that in the reverse scanning.

From these results, it can be seen that the structures of the storage capacitors according to the present invention (i.e., the structures in Embodiment 1 and Embodiment 2) can make possible a range of the low level driving voltage $V_G^L$ of the gate line larger than that in Comparative Example.

In Embodiments of the present invention, the driving of the gate lines is performed by selecting one gate line at a time. However, the present invention also can be applied to the case in which a plurality of gate lines are simultaneously selected. For example, in the storage capacitors provided in pixels which are connected to a plurality of gate lines simultaneously selected, gate lines constituting the other electrodes of the storage capacitors are constituted of a plurality of gate lines each selected in a respectively different period of time, none of which are the plurality of gate lines simultaneously selected. With such a structure, the same effect as that in the case where the driving of the gate lines is performed by selecting one gate line at a time can be obtained.

Although the poly-Si TFTs are employed in Embodiments of the present invention, the present invention can be universally applied to any liquid crystal display devices as long as the devices have the $C_S$-on-gate structure.

According to the liquid crystal display device of the present invention, it is possible to realize a high aperture ratio of the $C_S$-on-gate structure and a wide range of operation margin of the low level voltage $V_G^L$ of the gate line at the same time. Therefore, the liquid crystal display device having the storage capacitors $C_S$ with high reliability and high holding rate and thus having an improved display quality can be obtained.

Also, according to the liquid crystal display device of the present invention, the storage capacitor includes the electrodes connected to the pixel electrode and the electrodes connected to a plurality of gate lines, none of which is the gate line for driving the pixel. As a result, the capacitance of the storage capacitor $C_S$ per gate line becomes 1/(the number of the plurality of gate lines) of that in the conventional $C_S$-on-gate structure in which one of electrodes constituting the storage capacitor $C_S$ is connected to one gate line. As can be appreciated from Expression 1, the amount of a change in the voltage of the gate line due to the presence of the storage capacitor $C_S$ is applied to the pixel electrode. Therefore, the voltage rise due to the presence of the storage capacitor becomes 1/(the number of the plurality of gate lines) of that in the conventional $C_S$-on-gate structure in which one of electrodes constituting the storage capacitor $C_S$ is connected to one gate line. Moreover, since each of the gate lines is sequentially selected at a respectively different period of time, a voltage rise due to the presence of each of the storage capacitors $C_S$ occurs at a respectively different period of time. As a result, the total amount of the voltage increases due to the presence of all the storage capacitors $C_S$ can be reduced to be 1/(the number of the plurality of gate lines) of that in the conventional $C_S$-on-gate structure in which one of electrodes constituting the storage capacitor $C_S$ is connected to one gate line.

Moreover, the above-described plurality of gate lines are structured so as to be divided between a gate line whose scanning order is before the gate line for driving the pixel and a gate line whose scanning order is after the gate line for driving the pixel. As a result, the voltage increases due to the storage capacitors $C_S$ are also divided so as to occur before and after driving the pixel. As a result, effects on the pixel voltage signal due to a rise in the voltage resulting from the presence of the storage capacitor $C_S$ connected to the gate line before driving the pixel are eliminated since the rewriting of the signal is performed by driving the pixel immediately after the voltage rise. Accordingly, the total amount of the voltage increases due to the presence of all the storage capacitors $C_S$ is reduced to be 1/(the number of the plurality of gate lines) of that in the conventional $C_S$-on-gate structure in which one of electrodes constituting the storage capacitor $C_S$ is connected to one gate line. In addition, effects on the display can be further reduced. In this case, even when scanning of the gate lines is performed in the opposite direction, the pixel voltage signal results in the same condition as that in the forward scanning. Thus, the liquid crystal display device having this structure can be applied to various things regardless of its scanning order.

Furthermore, according to the liquid crystal display device in which the gate lines have a one-way scanning direction, the plurality of gate lines are gate lines whose scanning orders are prior to that of the pixel. As a result, effects on the pixel voltage signal due to a voltage rise resulting from the presence of the storage capacitor $C_S$ connected to the gate line before driving the pixel are eliminated since the rewriting of the signal is performed by driving the pixel immediately after the voltage rise. Thus, the period of time between a point when the rewriting of the signal by driving the pixel is completed and a point when subsequent voltage change due to the storage capacitor $C_S$ occurs can be prolonged, thereby reducing effects on the display.

Also, according to the liquid crystal display device in which the gate lines have a two-way scanning direction, the plurality of gate lines are constituted of a gate line disposed before the pixel and a gate line disposed after the pixel. As a result, in both cases of the forward scanning and the reverse scanning of the gate lines, voltage increases due to the presence of the storage capacitors $C_S$ are divided so as to occur before and after driving the pixel. Accordingly, the pixel voltage signal in the case of the forward scanning and that in the case of the reverse scanning become identical. Thus, the same display quality can be realized even when the scanning direction is switched.

Moreover, according to the liquid crystal display device in which a plurality of gate lines are simultaneously selected, the above-described plurality of gate lines each constituting one electrode of the storage capacitor are constituted of gate lines which are not simultaneously selected. As a result, a reduction in the voltage change due to the storage capacitor $C_S$ can be realized as in the case where driving of gate lines is performed by selecting one gate line at a time.

Furthermore, the storage capacitor employs the gate insulation film of the pixel transistor as an insulation layer. As a result, the gate insulation film has a smaller thickness as compared to a conventional structure employing an interlayer insulation film in the lower layer of the pixel electrode. Consequently, an area required for the storage capacitor $C_S$ can be made smaller than that required for the conventional storage capacitor $C_S$. Accordingly, an aperture ratio of the pixel can be made larger due to a reduction in size of the storage capacitor $C_S$, thereby improving brightness of the liquid crystal display device.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An active matrix type liquid crystal display device, comprising:
   a plurality of data lines and a plurality of gate lines disposed in a lattice manner; and
   a pixel having a pixel transistor, a pixel electrode, and storage capacitors, the pixel being disposed at a intersection between the data line and the gate line,
   wherein the storage capacitors include an electrode connected to the pixel electrode and gate capacitor electrodes connected to the plurality of gate lines, none of which is a gate line for driving the pixel.

2. A liquid crystal display device according to claim 1, wherein the plurality of gate lines are structured so as to be divided between a gate line whose scanning order is before the gate line for driving the pixel and a gate line whose scanning order is after the gate line for driving the pixel.

3. A liquid crystal display device according to claim 1, wherein the gate line has a one-way scanning direction, and the plurality of gate lines are gate lines whose scanning is performed prior to that of the pixel.

4. A liquid crystal display device according to claim 1, wherein the gate line has a two-way scanning direction, and the plurality of gate lines are constituted of a gate line disposed before the pixel and a gate line disposed after the pixel.

5. A liquid crystal display device according to claim 1, wherein a plurality of gate lines are simultaneously selected, and the plurality of gate lines each constituting one electrode of the storage capacitor are gate lines which are not simultaneously selected.

6. A liquid crystal display device according to claim 1, wherein the storage capacitor employs a gate insulation film of the pixel transistor as an insulation layer.

* * * * *